Aug. 14, 1923.

L. A. PAINE

ATTACHMENT FOR INDICATORS

Filed Sept. 26, 1921

1,464,772

Inventor.
Louis A. Paine.
by H. J. S. Dennison
Atty.

Patented Aug. 14, 1923.

1,464,772

UNITED STATES PATENT OFFICE.

LOUIS ARTHUR PAINE, OF TORONTO, ONTARIO, CANADA, ASSIGNOR TO THE LINCOLN METER COMPANY, LIMITED, OF TORONTO, ONTARIO, CANADA.

ATTACHMENT FOR INDICATORS.

Application filed September 26, 1921. Serial No. 503,227.

*To all whom it may concern:*

Be it known that I, LOUIS A. PAINE, a citizen of the United States of America, and resident of the city of Toronto, county of York, Province of Ontario, in the Dominion of Canada, have invented certain new and useful Improvements in an Attachment for Indicators, described in the following specification and illustrated in the accompanying drawings, that form part of the same.

The principal objects of the invention are, to ensure the accurate recording of meter registrations, thereby avoiding losses and to devise a simple and effective means for ensuring the positive retention of the indicator at the point of maximum registration.

A further and important object is to devise a very simple attachment for various kinds of indicators which will not interfere with proper operation of very delicate registering instruments and will be inexpensive and simple to install.

The principal feature of the invention consists in the novel arrangement of a brake drum with the meter indicator member and a spring actuated brake for holding the drum, whereby the normal operation of the indicator is not impeded but the indicator is retained securely in adjusted positions.

Figure 1:
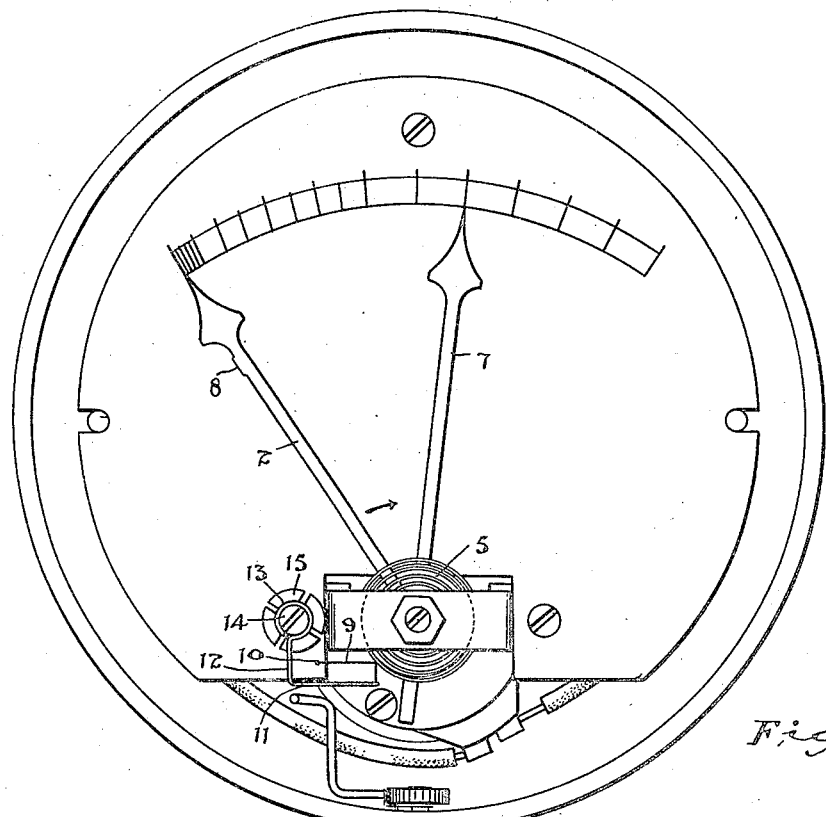

In the drawing Fig. 1 is a plan view of an electric meter showing the application of my device.

Figure 2:
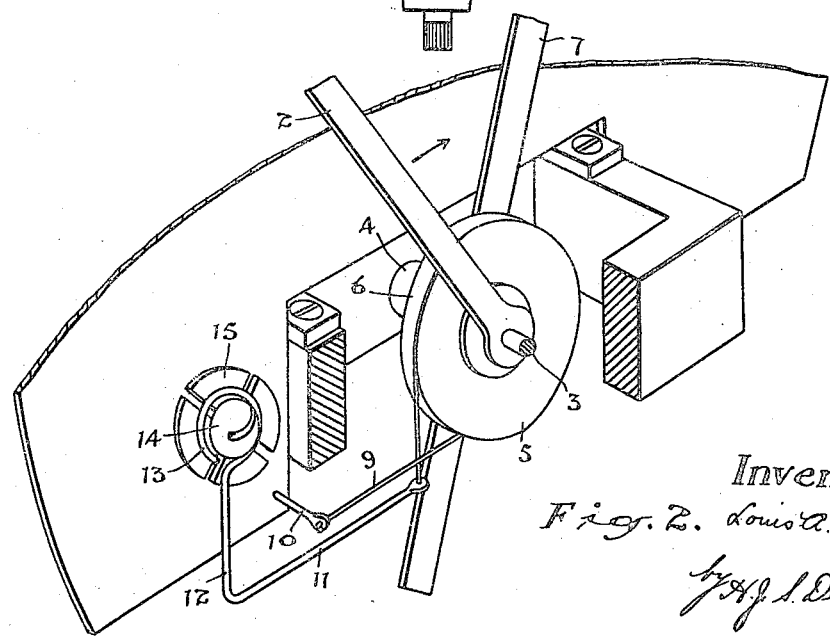

Fig. 2 is an enlarged perspective detail showing the braking attachment.

The invention is herein shown as applied to a demand watt meter provided with two indicator pointers, the flow of the current is indicated on the scale by the indicating pointer 2 which is operated by the meter apparatus.

The pointer 2 is supported upon a spindle 3 which is journalled in suitable bearings, and upon this spindle is loosely mounted a sleeve member 4. At one end of the sleeve is secured a brake drum 5 having a peripheral groove 6. To this drum is secured the maximum demand indicator 7.

The pointer 2 is provided with a lug 8 which is adapted to engage the indicator 7 and carry it with it over the dial and leave it at the maximum point.

It has been difficult and hitherto practically impossible to retain the indicator 7 in its adjusted positions owing to the action of vibration as any holding means must not interfere with the operation of the delicate meter operated member.

The device shown accomplishes the desired result.

A fine cord 9 preferably a silk thread, is secured at a fixed point, indicated by the pin 10 and it is carried around the grooved periphery of the drum 5 in a direction opposite to the direction of rotation of said drum when moved by the registering finger 2. The other end is secured to a flexible arm 11 which is shown as a spring wire having a right angle bend 12 and a coiled extremity 13 which encircles the screw 14, the terminal end being secured in the radially slotted washer 15.

The tension of the arm 11 is regulated by loosening the screw and turning the washer so as to regulate the tension on the coil 13. This increases or decreases the tension on the silk cord encircling the drum.

It will be readily seen that as the indicator fingers move across the dial from the zero mark the pull of the drum upon the cord will be against the flexible arm 11 and the drum will slip freely. When the pressure of the meter is released the spring pressure on the cord causes it to grip and hold the drum securely against rotation except through a directly applied force. Consequently vibration will not cause the indicator to be displaced and an accurate record of the operation of the meter will be retained.

What I claim as my invention is:—

1. An attachment for indicators, comprising, the combination with a meter instrument a freely rotatable indicator member operated by the instrument, and means adapted to automatically bind and hold said freely rotatable indicator member, the binding of said means being relieved by the torque applied by the instrument.

2. An attachment for indicators, comprising, the combination with a meter instrument a freely rotatable indicator member operated by the instrument, a drum secured to said freely rotatable indicator member, and means resiliently encircling said drum adapted to automatically grip said drum, said means being adapted to automatically release through the application of torque to the rotatable member.

3. An attachment for indicators, comprising, the combination with a meter instrument a freely rotatable indicator member operated by the instrument, a drum secured to said freely rotatable indicator member, a friction band encircling said drum, and a spring exerting a pull upon said band in a direction opposite to the direction of rotation of the drum.

4. An attachment for indicators, comprising the combination with a meter instrument a freely rotatable indicator member operated by the instrument, a drum secured to said freely rotatable indicator member and having a grooved periphery, a flexible cord encircling the grooved drum, and a spring adjustably supported and pulling upon an end of said cord to create a binding grip which will be freed by the rotation of the instrument.

5. An attachment for indicators, comprising, the combination with a meter instrument a freely rotatable indicator member operated by the instrument, a drum secured to said member, and having a grooved periphery, a flexible cord fixed at one end and encircling the grooved drum, a spring arm having one end connected to the free end of said cord, a rotatable adjusting member supporting said spring arm and means for locking the spring supporting member in adjusted positions.

LOUIS ARTHUR PAINE.